US008892683B2

(12) United States Patent
Liu et al.

(10) Patent No.: US 8,892,683 B2
(45) Date of Patent: Nov. 18, 2014

(54) WEBSITE OBJECT DEPENDENCY FILE CREATION AND USE THEREOF

(75) Inventors: Bojin Liu, Davis, CA (US); Lorenzo Vicisano, Berkeley, CA (US); Rajiv Kumar Vijayakumar, La Jolla, CA (US); Saumitra M. Das, San Jose, CA (US); Behrooz Khorashadi, Mountain View, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 635 days.

(21) Appl. No.: 13/157,391

(22) Filed: Jun. 10, 2011
(Under 37 CFR 1.47)

(65) Prior Publication Data

US 2012/0317226 A1    Dec. 13, 2012

(51) Int. Cl.
*G06F 15/16* (2006.01)
*G06F 7/00* (2006.01)
*H04L 29/08* (2006.01)
*H04W 4/18* (2009.01)

(52) U.S. Cl.
CPC *H04L 67/02* (2013.01); *H04W 4/18* (2013.01)
USPC .......................................... 709/217; 707/752

(58) Field of Classification Search
CPC ................................. H04L 67/02; H04W 4/18
USPC ........................................................... 709/217
See application file for complete search history.

(56) References Cited

U.S. PATENT DOCUMENTS

| 2003/0004984 A1* | 1/2003 | Chou ............................ 707/500 |
| 2003/0065638 A1* | 4/2003 | Robert .............................. 707/1 |
| 2005/0198309 A1* | 9/2005 | Li et al. .......................... 709/227 |
| 2008/0222244 A1* | 9/2008 | Huang et al. ................... 709/203 |
| 2008/0294619 A1* | 11/2008 | Hamilton et al. .................. 707/5 |
| 2010/0049787 A1* | 2/2010 | Tsai et al. ....................... 709/203 |

* cited by examiner

*Primary Examiner* — Shaq Taha
(74) *Attorney, Agent, or Firm* — Neugeboren O'Dowd PC

(57) ABSTRACT

A mobile computing device comprising a wireless transmitter/receiver, processing components, memory components, and a web browser. The web browser is adapted to, initiate a first request to view a website comprising a plurality of objects, and, receive the plurality of objects in a first order. The web browser is further adapted to, determine a new order for requesting the plurality of objects, and, initiate a request to view the website comprising the plurality of objects in the new order. The web browser is also adapted to receive the plurality of objects in the new order.

13 Claims, 6 Drawing Sheets

WEBSITE OBJECT DEPENDENCY FILE CREATION AND USE THEREOF

FIELD OF THE INVENTION

The present invention relates to website content. In particular, but not by way of limitation, the present invention relates to optimized apparatus and methods for mobile computing devices to fetch website content; and web browser cache prioritization.

BACKGROUND OF THE INVENTION

Most web pages comprise complicated structures where hundreds of objects of different object types make up the structure of the website. Some objects may require the fetching of additional objects. Due to this complicated website structure, mobile computing device users often experience a poor web browsing experience when fetching data from websites while using the mobile device. For example, due to lower power processors and memory storage, users experience slow parsing performance. Furthermore, high RTT cellular networks impose time overhead for each object fetched from the website. Therefore, users may be required to wait an increased time to download the objects.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention comprises optimizing the order of website object fetching so a better web browsing experience is created. For example, one embodiment of the invention comprises a method of receiving a plurality of website objects. One method comprises sending a request to view a website from a mobile computing device, where the website comprises the plurality of objects. The method further comprises receiving the plurality of objects in a first order, and rendering the website a first time. The method further comprises placing the plurality of objects in a new order corresponding to a new order of requesting to receive the plurality of objects. The new order is adapted to render at least a portion of the website in less time than rendering the at least a portion of the website the first time.

Another embodiment of the invention comprises a mobile computing device comprising a wireless transmitter/receiver, processing components, memory components, and a web browser. The web browser is adapted to initiate a first request to view a website comprising a plurality of objects. The browser is further adapted to receive the plurality of objects in a first order and subsequently determine a new order for requesting the plurality of objects. The web browser may then initiate a request to view the website in the new order and receive the plurality of objects in the new order.

And another embodiment of the invention may be characterized as a mobile computing apparatus. One mobile computing apparatus comprises means for requesting to view a website comprising a plurality of objects. The apparatus further comprises a means for fetching the plurality of objects in a first order, comprising an order determined by the website. In addition, the apparatus comprises means for utilizing the first order of fetching the plurality of objects to create a new order of fetching the plurality of objects, where the new order is different than the first order. The apparatus also comprises a means for fetching the plurality of objects in the new order.

Yet another embodiment of the invention may be characterized as a non-transitory, tangible computer readable storage medium, encoded with processor readable instructions to perform a method of fetching a plurality of objects from a website. One method comprises sending a first request to view a website from a mobile computing device, with the website comprising the plurality of objects. From this first request, the mobile computing device is adapted to determine an order that the plurality of objects are requested. Thereupon, a second request to view the website is sent from the mobile computing device. However, the second request requests the plurality of objects in the order of established from the first request to view the website.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
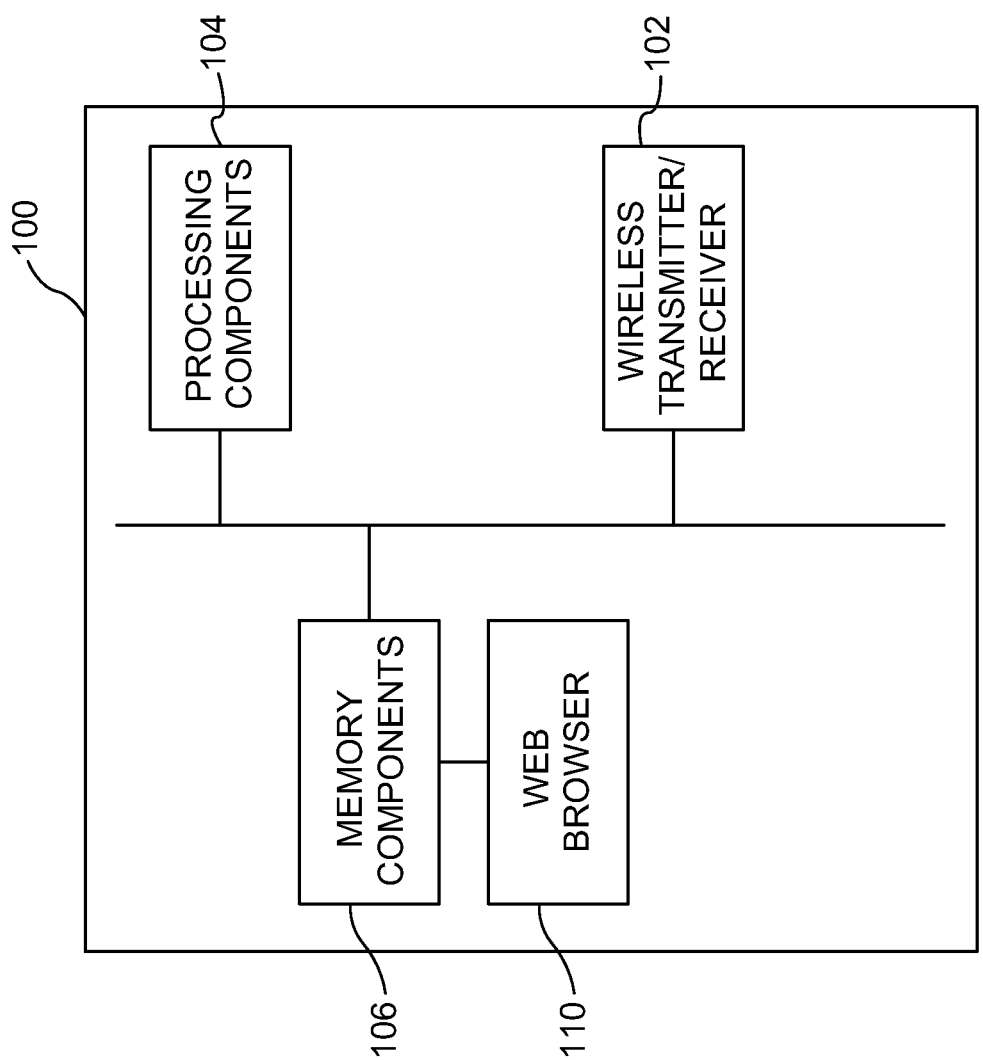
FIG. 1 illustrates a block diagram depicting physical components of an exemplary embodiment of the present invention.

Referring first to FIG. 1, shown is a block diagram depicting physical components of a mobile computing device 100. One mobile computing device 100 comprises a wireless transmitter/receiver 102, processing components 104, memory components 106, and a web browser 110. In one embodiment, the web browser 110 may be stored in the memory components 106. The web browser 110 may be adapted to initiate a first request to view a website comprising a plurality of objects (also known as website objects), for example, upon receiving a command from a mobile computing device user to do so.

Figure 2:
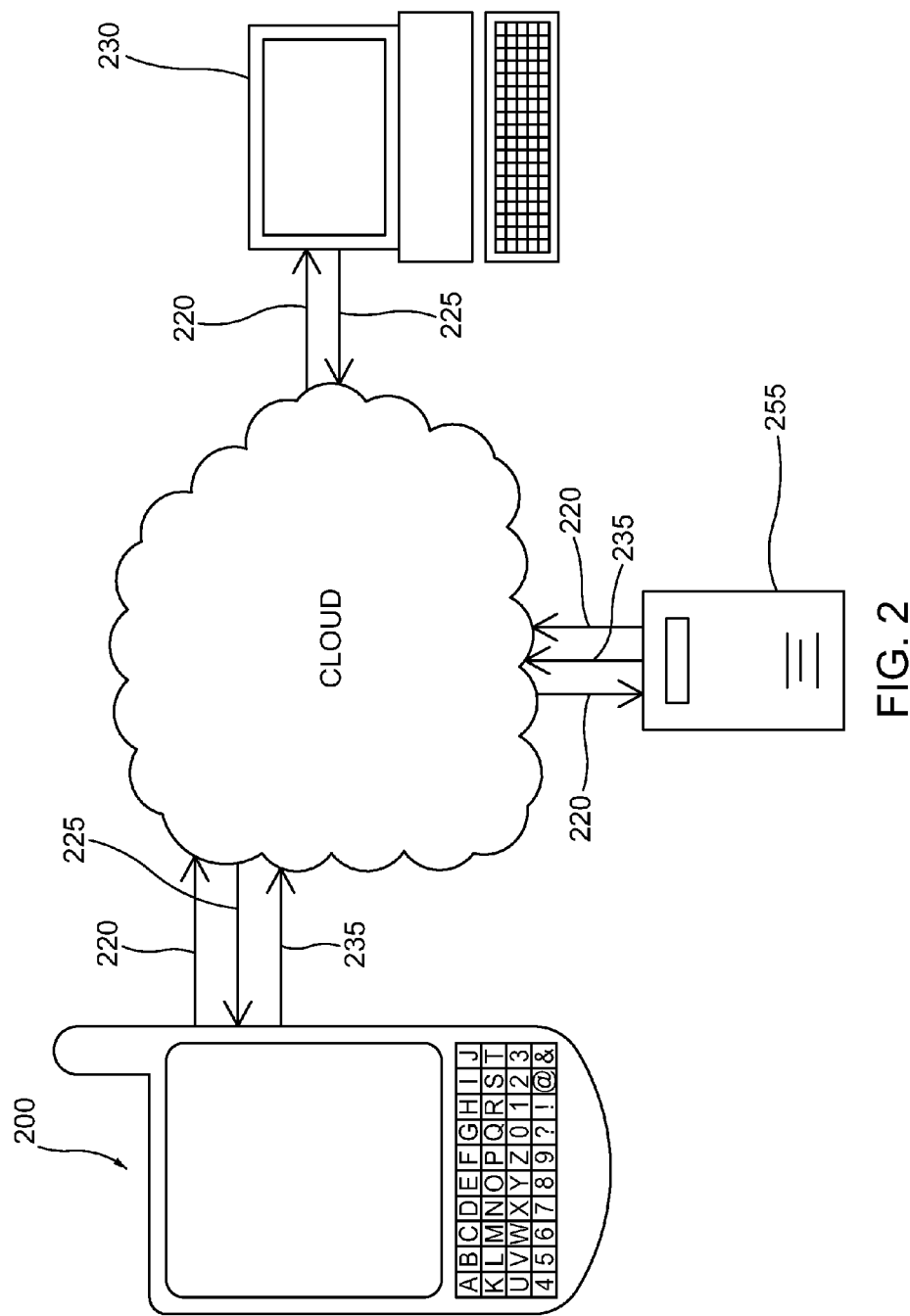
FIG. 2 illustrates the communication between a mobile computing device, a proxy device, and a host device of an exemplary embodiment of the invention.

Seen in FIG. 2 is one example of the communication between the mobile computing device 200 and a website host 230. The mobile computing device 200 may send a first request 220 to the website host 230, where the first request 220 is a request to view a website stored on the host 230. In one embodiment, the website comprises a plurality of objects. For example, the web page may be comprised of object file types such as, but not limited to, HTML, cascading style sheets, jpegs, and java-scripts.

Upon receiving the first request 220 from the mobile computing device 200, the website host 230 may provide a response 225. The response 225 may provide the mobile computing device 200 with one or more of the plurality of objects comprising the website. In one embodiment, the plurality of objects is provided to the mobile computing device 200 in the response 225 in a first order. For example, the mobile computing device 200 may receive an HTML object as a first object received from the website host 230 in the response 225. The HTML object may comprise a website base dependency level. The website base dependency level may provide a website structure. For example, the base dependency level may reference additional objects that comprise the website. As these additional objects are dependent on the base dependency level object, these objects may comprise a first dependency level. The additional objects may reference yet further objects comprising additional dependency levels such as, but not limited to, a second and a third dependency level (and so on). Dozens of dependency levels may be frequently found in websites. In such a case where multiple dependency levels are encountered by the web browser 110, the first order in which the plurality of objects are received by the mobile computing device may be the order in which the plurality of objects are found in the base-level object and subsequently requested in one or more additional first requests 220, provided in one or more responses 225 by a website host 230, and received in one or more first responses 225 by the web browser 110. It is to be appreciated that although the web browser 110 is referenced throughout the specification as the mobile computing device application adapted to request/receive website objects, other applications may also be involved in these functions, such as, but not limited to, a webkit. In receiving the website objects from the host 230 in response to the first request 220, the website may be rendered a first time on the mobile computing device 100.

Upon receiving the plurality of objects in the first order in the first response 225, in one embodiment, the mobile computing device 200 may implement an algorithm to determine a new order of requesting the plurality of objects in a second request 235. Other devices such as, but not limited to, a proxy device 255, may also be adapted to determine the new order. One new order may comprise an order different than the first order. For example, in one new order, one of the objects comprising a third dependency level object may be requested prior to an object comprising a second dependency level object.

One algorithm adapted to determine a new order of requesting the plurality of objects may comprise one or more functions such as, but not limited to, Get_Dependency and Merge_With_Perm functions. Such functions may be adapted to create a file comprising the dependency of each object in the web site. Such a file may be referred to as a master dependency level, master dependency order, a master object dependency file, a dependency graph, or a combination of these terms. From the master dependency level the new order of requesting objects in one or more second requests 235 may be determined. Other operations besides creating a new order may also be based upon the master dependency level.

One Get_Dependency function comprises:

```
Get_Dependency (index_page, perms[obj_tree_root]):
    Graph_root = parse_page_level_objs (index_page)
```

-continued

```
for obj_tree in perms[ ]:
    Graph_root = Merge_With_Perm (Graph_root, obj_tree)
return Graph_root
```

One Merge_With_Perm function comprises:

```
Merge_With_Perm (Graph_root, obj_tree)
    for node in DFS (object_tee) but not object_tree_root:
        if node in DFS (Graph_root):
            if node.parent not in find_parents (Graph_root, node):
                add_parent (Graph_root,node,node. parent)
        else:
            for parent in find_parents (object_tree, node):
                add_child (Graph_root,parent, node)
    return Graph_root
```

In one embodiment, upon receiving the plurality of objects in the first order in the first response 225, the Get_Dependency( ) function may be called by the web browser 110. For example, as seen above, the web browser 110 may supply index_page and perms[obj_tree_root] as the parameters for the Get_Dependency( ) function. The index_page parameter may comprise an identifier corresponding to the website requested, while the perms[obj_tree_root] parameter may correspond to the number of sequences that (i.e. the number of separate orders in which) the plurality of objects were received by the mobile computing device 200 across various first requests 220.

Initially, when the mobile computing device 200 requests to view the website, the perms[obj_tree_root] variable will only comprise the first order of the plurality of objects received in the first response 225. For each subsequent request of the website by the mobile computing device 200, and the subsequent reception of the plurality of objects by the mobile computing device 200, the order in which the plurality of objects is requested in subsequent one or more second requests 235 and received by the mobile computing device 200 in the subsequent response may be different than the order in the first request 220 and first response 225. It is contemplated that each order of object reception that is different from each previous order that the objects were received in may be saved in the memory components 106 or elsewhere—such as, but not limited to, saved remotely in the proxy device 255. In one example, when the mobile computing device 200 accesses a website from a first location at a first time of the day, the objects may be received in a first order. However, when the same website is accessed from a second location at a second time of the day that may be different from the first location and/or the first time of the day, the plurality of objects may be received in a new order that may be different from the first order. It is the order of the reception of the plurality of objects that may be saved in one embodiment.

The parse_page_level_objs (index_page) function will initially parse the requested website to determine which objects comprise the first dependency level of objects. For example, as stated, a first dependency level of objects may comprise objects that are dependent upon a base-level object such as, but not limited to, a HTML object. Upon determining the first dependency level of objects, the parse_page_level_objs function may then determine subsequent dependency levels and merge the base and first dependency level objects, and each subsequent object dependency level, with the saved orders to create a master dependency order, such merging may occur with the Merge_With_Perm (Graph_root, obj_tree) function. As seen, the first iteration of the Merge_With_Perm function returns a Graph_root variable comprising a dependency level only up to the first dependency level. Upon running the Merge_With_Perm function for the entire first order of objects, all dependencies are added to the Graph_root variable. The Graph_root variable is then returned to the Merge_With_Perm function and run again for each successive saved order until all the dependencies of all objects on all other objects, based on the received orders of the plurality of objects are added, creating the master dependency level. As discussed below, simulated requests and returned object orders may also be incorporated.

As seen in the Merge_With_Perm function, the DFS (object_tree) subroutine traverses the object_tree file and adds each node to the base dependency level (or previous dependency level, depending on the iteration of the subroutine) in the order they are encountered during the traversal. The object_tree file may comprise the saved object order. The find_parents (root, node) function may return and place all object dependencies (i.e., nodes) in the master dependency level.

Figure 3:
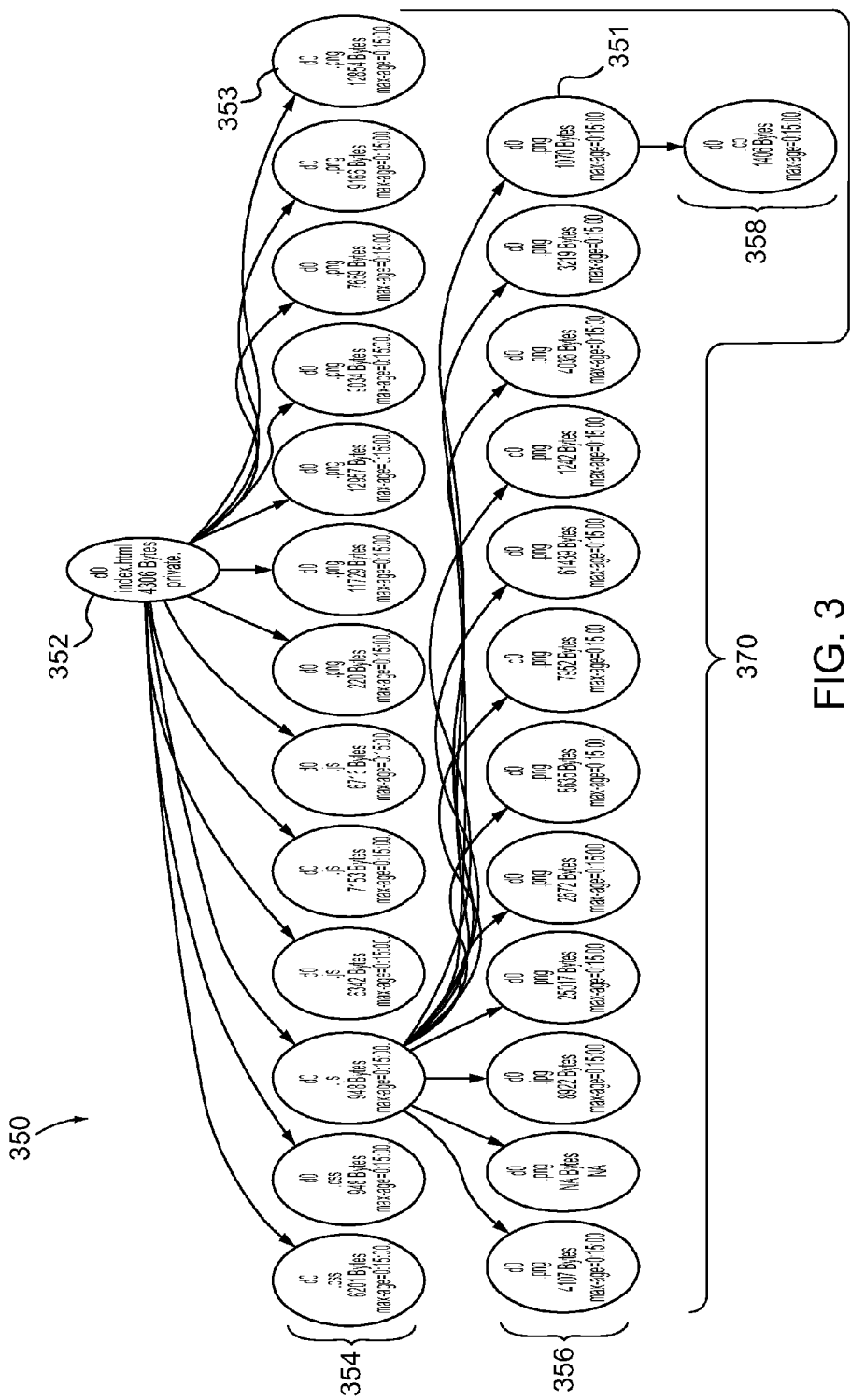
FIG. 3 illustrates a master dependency level of an exemplary embodiment of the present invention.

Seen in FIG. 3 is one example of a master dependency level 350 that may be derived from the above listed functions. The master dependency level 350 of FIG. 3 comprises a base object dependency level 352, a first object dependency level 354, wherein each of the objects of the first object dependency level 354 are dependent upon at least one object in the base object dependency level 352, a second object dependency level 356, and a third object dependency level 358, with each object in the second and third dependency levels being dependent upon at least one object in an immediately preceding dependency level.

From the master dependency level 350, the mobile computing device 200 may determine a new order for requesting the plurality of objects. For example, in one or more second requests 235, the mobile computing device 200 may request one or more objects in the second dependency level 356 or the third dependency level 358 before an object in the first dependency level 354. It is to be appreciated that the base dependency level 352 may be requested first. The mobile computing device 200 may take into account network characteristics to determine the new order to request the objects from the master dependency level 350. Additionally, a first object 351 having one or more objects dependent on the first object 351 may be requested before a second object 353, where the second object 353 does not have one or more objects dependent on the second object 353. As seen in FIG. 3, the first object 351 may be located in a deeper, or lower, dependency level than the second object 353.

Figure 6:
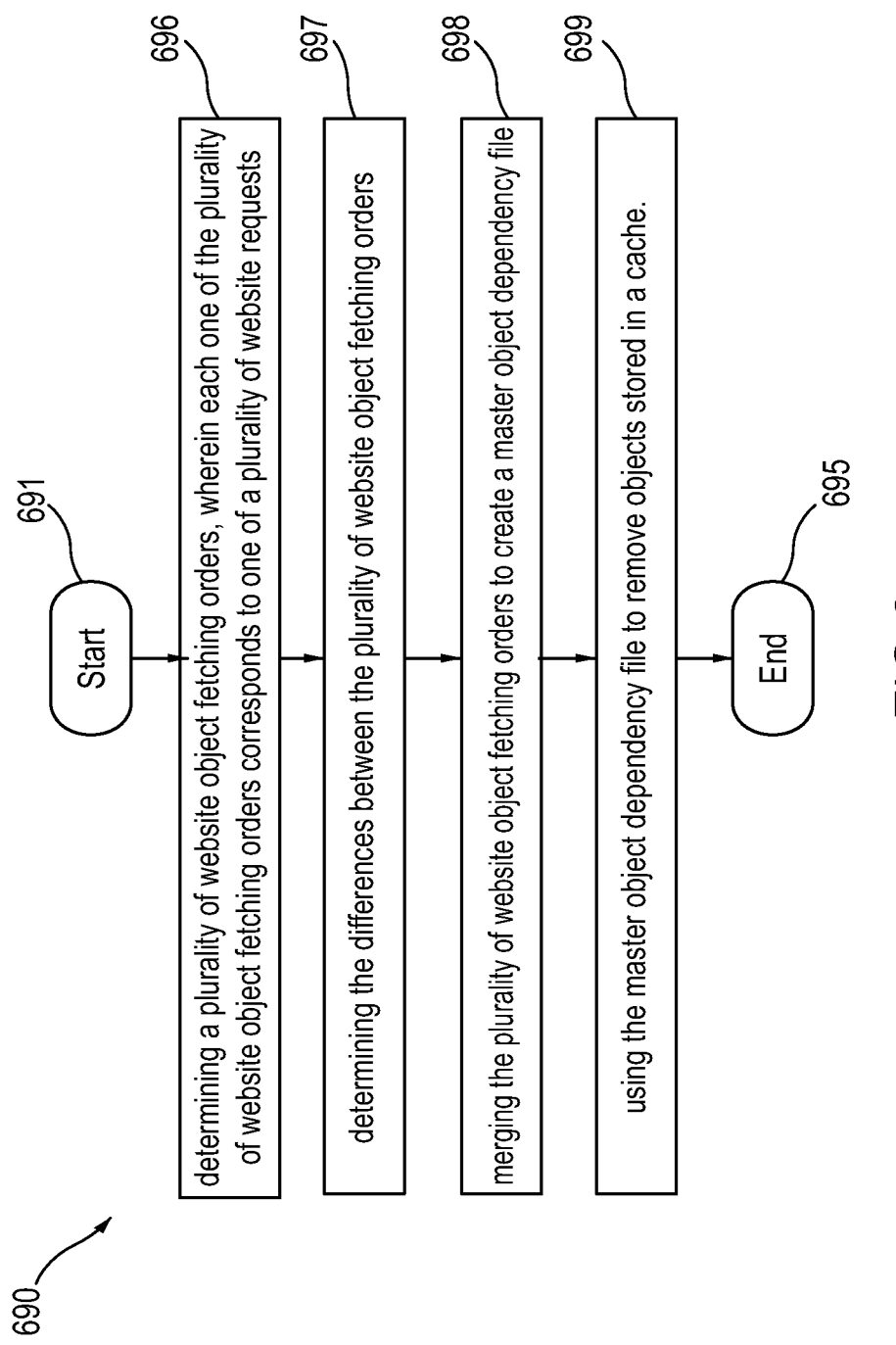
FIG. 6 is a flowchart that depicts a method that may be carried out in connection with the embodiments described herein.

A similar manner may be used to remove objects from a cache. For example, in one embodiment, when a mobile computing device determines that objects should be removed from a cache due to, for example, a cache being full, the mobile computing device may use the dependency graph— i.e., the master dependency level 350 seen in FIG. 3 to determine which objects should be removed from the cache. As seen in FIG. 6, one method 690 of removing cache objects starts at 691. At 696 the method 690 comprises determining a plurality of website object fetching orders, wherein each one of the plurality of website object fetching orders corresponds to one of a plurality of website requests. For example, as discuss above, a mobile computing device 200 may receive a plurality of objects in response to the first request 220 and the second request 235, where the plurality of objects are received in a first order in a response 225 to the first request and the plurality of objects are received in a second order in a response 225 to the second request 235, where the second order may be different than the first order.

At 697 the method 690 comprises determining the differences between these plurality of website object fetching orders. A website object fetching order may comprise the order in which the plurality of objects are requested in one or more first requests 220, second requests 235, or further requests and/or the order in which the plurality of objects are received in one or more first responses 225, one or more second responses, or one or more additional responses. At 698, the object fetching orders are then merged to create a master object dependency file 350, as seen in FIG. 3, and at 699, one method 690 comprises using the master object dependency file to remove objects stored in a cache. In one embodiment, the cache may comprise a web browser cache and the objects stored in the cache may comprise one or more independent objects and one or more dependent objects. An independent object may comprise an object not having any other objects dependent on the independent object, while a dependent object may comprise an object having one or more objects dependent on the dependent object. For example, seen in FIG. 3 is a first object 351 comprising a dependent object and a second object 353 comprising an independent object. In such a master object dependency file 350, at least one of the one or more independent objects may be removed from the cache before at least one of the one or more dependent objects. In such a manner, website may be displayed more quickly since the dependent objects 351 need not be requested and only independent objects 353 need to be received to display the webpage. This is similar to using the master object dependency file 350 to request dependent objects 351 before independent objects 353 in order to more quickly display the webpage.

Figure 4:
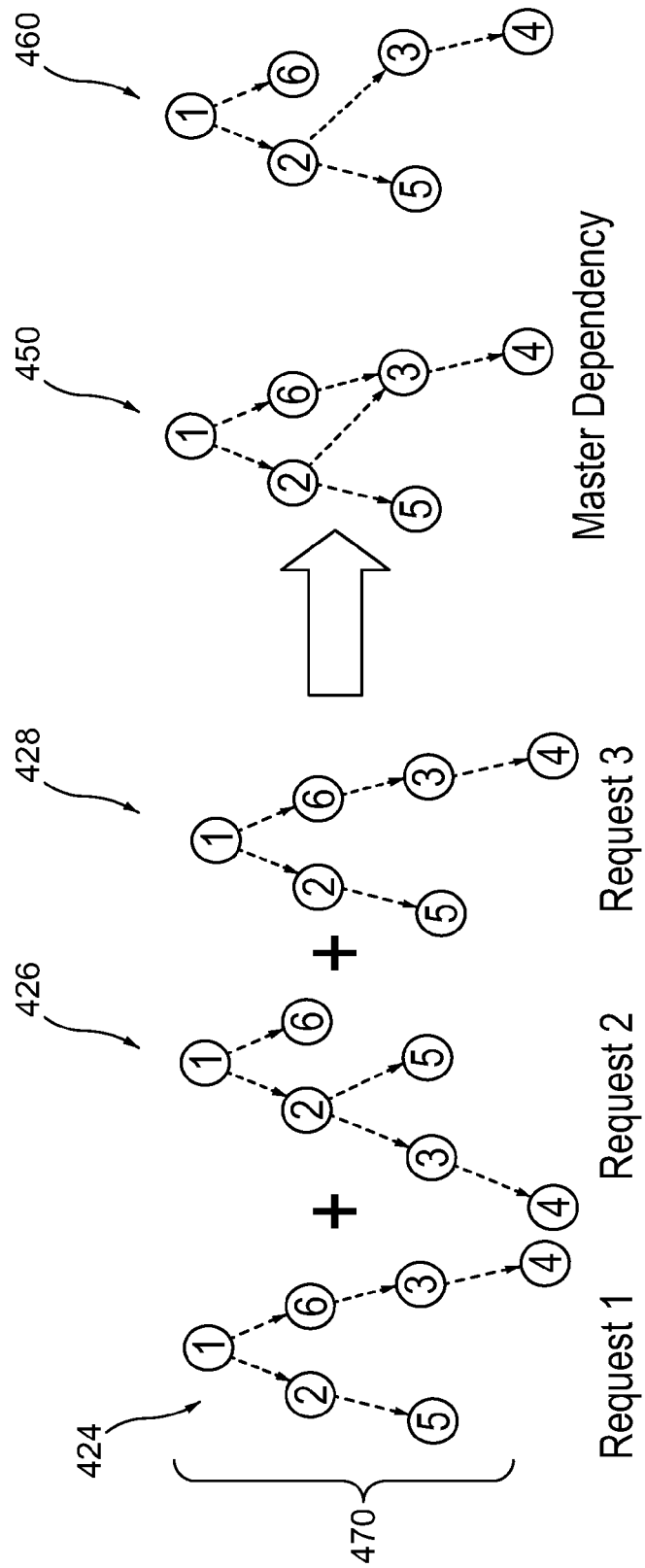
FIG. 4 Illustrates a plurality of requests of an exemplary embodiment of the present invention.

Seen in FIG. 4 is an embodiment where a master dependency level is determined from three requests comprising a first request 424 having a first order of object reception by the mobile computing device 200, a second request 426 comprising a new order of object reception by the mobile computing device 200, and a third request 428 comprising a third order, wherein the third order is the same as the first order. The master dependency level 450 for these requests is provided by the functions above. At a subsequent request after the three requests in FIG. 4, the mobile computing device may determine that, based on factors such as, but not limited to, website structure and network characteristics such as, but not limited to, location of the objects in relation to the device, a new order 460 may be used to request the objects. The new order 460 seen in FIG. 4 comprises the second order. Upon requesting the object in the new order 460, the mobile computing device may receive the objects in the new order 460. One new order 460 may be adapted to minimize the amount of time required to receive the plurality of objects at the mobile computing device 200. For example the time to receive the website objects may be minimized by at least one of, requesting objects hosted by a device located at a first distance from the mobile computing device prior to requesting objects hosted by a device located at a second distance from the mobile computing device, wherein the first distance is greater than the second distance, and, requesting a plurality of objects in-parallel. Furthermore, the new order 460 for requesting the plurality of objects may comprise, requesting at least one object prior to the when the at least one object was requested in the first order 424.

Figure 5:
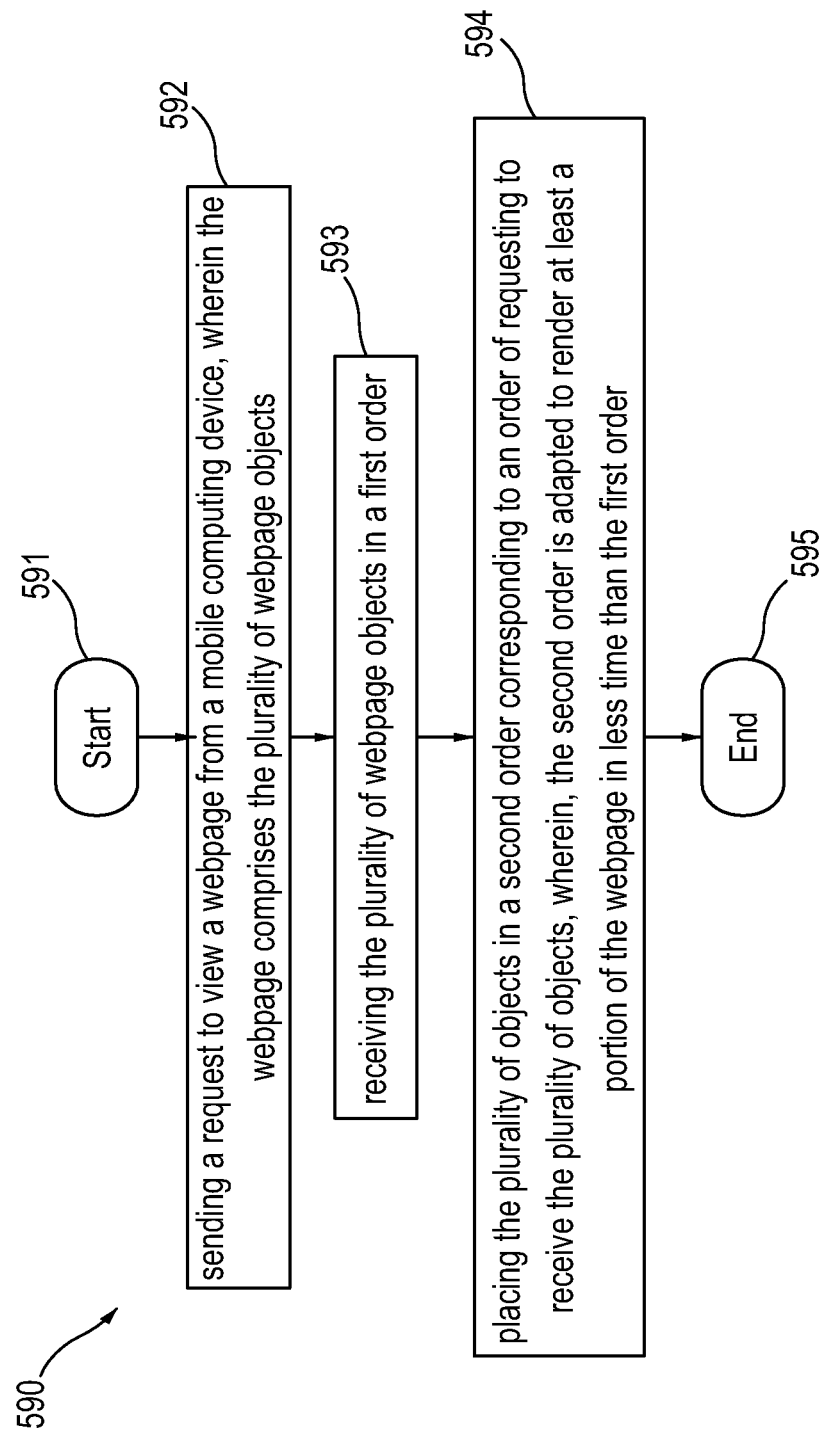
FIG. 5 is a flowchart that depicts a method that may be carried out in connection with the embodiments described herein.

Turning now to FIG. 5, seen is a method 590 of receiving a plurality of webpage objects. One method 590 starts at 591. At 592 the method 590 comprises sending a request to view a webpage from a mobile computing device. For example, the request to view a webpage may comprise the first request 220 seen in FIG. 2. It is contemplated that in one embodiment, the webpage comprises the plurality of webpage objects such as, but not limited to, the objects 470 seen in FIG. 4, or the objects 370 seen in FIG. 3. At 593 the method 590 further comprises receiving the plurality of webpage objects in a first order. In one embodiment, receiving a plurality of webpage objects in a first order may comprise the receiving of the plurality of objects in the first order as described above with reference to FIG. 2. At 594 the method comprises placing the plurality of objects in a second order. One second order comprises the new order described above with reference to FIG. 2, obtained upon determining the master dependency level 350 of FIG. 3. In one embodiment, the second order may further correspond to an order of requesting to receive the plurality of objects 370. Furthermore, the second order may be adapted to render at least a portion of the webpage in less time than the first order.

In one method 590, the second order may be created by a proxy device 255. The proxy device may be a device adapted to receive the first request 220, instead of the website host 230 receiving the first request 220 from the mobile computing device 200. The proxy device 255 may also be adapted to send the first request 220 to the website host 230. Therefore, the proxy device 255 may be located between the mobile computing device 200 and the website host 230. The proxy device 255 may also be adapted to establish the new order in requesting the objects. In such an embodiment, the new order may be requested by the proxy device 255 instead of the mobile computing device 200, as described above. Although not seen in FIG. 2, the proxy device 255 may receive the response 225 from the host 230 and send the response 225 to the mobile computing device 200. The plurality of objects may also be received from the website host 230 at the proxy device 255 and sent to the mobile computing device 200 in the new order. The new order of objects sent from the proxy device 255 may be established in a similar manner as the new order 460 described above. For example, the proxy device 255 may use the functions described above and the algorithms therein. In one method 590, the proxy device 255 may use at least one simulated request to view the webpage upon receiving the first request 220. A simulated request may be generated through an application residing on the proxy device 255 and may provide additional orders of receiving the website objects such as, but not limited to, orders of receiving the objects that are similar to the order from the second request 426 and the order from the third request 428 seen in FIG. 4. The at least one additional simulated requests to view the webpage may comprise a first simulated request from a first location and a first time and a second simulated request from a second location and a second time, wherein the second location being different than the first location, and the second time being different than the first time. By simulating website requests from different locations and different times, simulated orders of the objects received at the mobile computing device 200 may be obtained.

In conclusion, embodiments of the present invention enable a mobile communicating device to modify the view of content displayed on the mobile computing device through movement of the mobile computing device. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device comprising:
a wireless transmitter/receiver;
processing components;
memory components; and
a web browser adapted to,
    initiate a first request to view a website comprising a plurality of objects,
    receive the plurality of objects in a first order,
    determine a new order for requesting the plurality of objects,
    initiate a new request to receive the plurality of objects in the new order, and
    receive the plurality of objects in the new order without prefetching one or more of the plurality of the objects prior to the new request;
wherein, the new order for requesting the plurality of objects comprises an order adapted to minimize an amount of time required to receive the plurality of objects;
wherein the new order is adapted to minimize the amount of time required to receive the plurality of objects by at least one of requesting one or more of the plurality of objects located on at least one first host device prior to requesting one or more of the plurality of objects located on at least one second host device, wherein,
    the at least one first host device is located a first distance from the mobile computing device,
    the one or more second host device is located a second distance from the mobile computing device, and
    the first distance is lesser than the second distance; and
providing multiple requests for the plurality of objects in-parallel.

2. The mobile computing device of claim 1 wherein, the new order for requesting the plurality of objects comprises, requesting at least one of the plurality of objects prior to the when the at least one of the plurality of objects was requested in the first order.

3. The mobile computing device of claim 1 wherein, the new order is determined from a plurality of additional orders; wherein each of the plurality of additional orders comprises an order of receiving the plurality of objects by the mobile computing device.

4. A method of receiving a plurality of website objects comprising:
sending a request to view a website from a mobile computing device, wherein the website comprises the plurality of website objects;
receiving the plurality of website objects in a first order;
rendering the website a first time; and
placing the plurality of website objects in a new order without prefetching one or more of the plurality of the objects prior to placing the plurality of website objects in the new order, wherein the new order,
    corresponds to an order of requesting to receive the plurality of objects, and
    is adapted to render at least a portion of the website in less time than rendering the at least a portion of the website while rendering the website the first time;
wherein, the new order for requesting the plurality of objects comprises an order adapted to minimize an amount of time required to receive the plurality of objects;
wherein, the new order is adapted to minimize the amount of time required to receive the plurality of objects by at least one of, requesting one or more of the plurality of objects located on at least one first host device prior to requesting one or more of the plurality of objects located on at least one second host device, wherein, the at least one first host device is located a first distance from the mobile computing device, the one or more second host device is located a second distance from the mobile computing device, and the first distance is lesser than the second distance; and providing multiple requests for the plurality of objects in-parallel.

5. The method of claim 4 wherein, the new order is developed, by a proxy device located between the mobile computing device and a website host; and from one or more functions adapted to use, the first order of receiving the plurality of website objects; and at least one order of receiving the plurality of website objects determined from a simulated request to view the website.

6. The method of claim 5 wherein, the simulated request to view the website comprises, a first simulated request from a first location and a first time; and a second simulated request from a second location and a second time, wherein, the second location being different than the first location; and the second time being different than the first time.

7. The method of claim 4 wherein, the new order comprises, an order different than the first order; and requesting a plurality of objects in-parallel.

8. The method of claim 4 wherein, the new order is dependent upon network characteristics; and further comprising, requesting to receive the plurality of objects in the new order.

9. The method of claim 8 wherein, the network characteristics comprise at least one of, a network type;

a network bandwidth; and a network location of the plurality of objects.

10. A non-transitory, tangible computer readable storage medium, encoded with processor readable instructions to perform a method of fetching a plurality of objects from a website comprising:

sending a first request to view the website from a mobile computing device, wherein the website comprises the plurality of objects;

determining a first order the plurality of objects are received at the mobile computing device;

determining at least one new order to request the plurality of objects; and sending at least one additional request to view the website from the mobile computing device, wherein the at least one additional request comprises the at least one new order to request the plurality of objects; and receiving the plurality of objects in the new order without prefetching one or more of the plurality of the objects prior to the at least one additional request;

wherein, the new order for requesting the plurality of objects comprises an order adapted to minimize an amount of time required to receive the plurality of objects;

wherein, the new order is adapted to minimize the amount of time required to receive the plurality of objects by at least one of, requesting one or more of the plurality of objects located on at least one first host device prior to requesting one or more of the plurality of objects located on at least one second host device, wherein, the at least one first host device is located a first distance from the mobile computing device, the one or more second host device is located a second distance from the mobile computing device, and the first distance is lesser than the second distance; and providing multiple requests for the plurality of objects in-parallel, wherein, the new order is adapted to minimize the amount of time required to receive the plurality of objects by at least one of, requesting one or more of the plurality of objects located on at least one first host device prior to requesting one or more of the plurality of objects located on at least one second host device, wherein, the at least one first host device is located a first distance from the mobile computing device, the one or more second host device is located a second distance from the mobile computing device, and the first distance is lesser than the second distance; and providing multiple requests for the plurality of objects in-parallel.

11. The non-transitory, tangible computer readable storage medium of claim 10 wherein, the at least one new order to request the plurality of objects is created by, determining a plurality of website object fetching orders, wherein each one of the plurality of website object fetching orders corresponds to one of a plurality of website requests, determining the differences between the plurality of website fetching orders; and merging the object fetching orders to create a master object dependency file.

12. The non-transitory, tangible computer readable storage medium of claim 10 wherein, at least one of the first request to view the website from the mobile computing device and the at least one additional request to view the website from the mobile computing device comprise a simulated request.

13. The non-transitory, tangible computer readable storage medium of claim 10 wherein, determining a first order the plurality of objects are received at the mobile computing device comprises creating a master object dependency file.

* * * * *